United States Patent Office 3,461,650
Patented Aug. 19, 1969

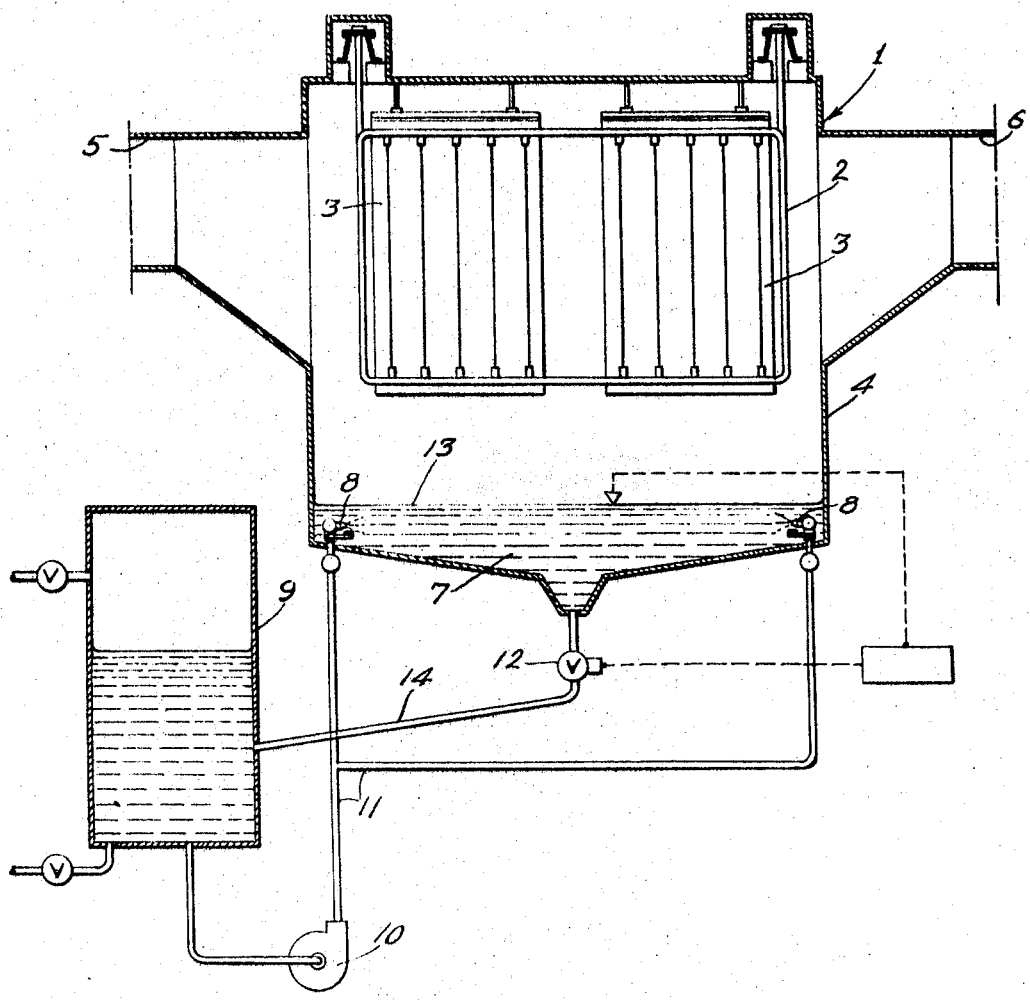

3,461,650
METHOD OF DISCHARGING DUST PRECIPITATED IN AN ELECTROSTATIC PRECIPITATOR
Gösta Mildh, Vaxjo, Sweden, assignor to Aktiebolaget Svenska Flaktfabriken, Stockholm, Sweden
Filed Mar. 29, 1966, Ser. No. 538,428
Claims priority, application Sweden, Mar. 31, 1965, 4,122/65
Int. Cl. B03c 3/00, 3/88
U.S. Cl. 55—12         3 Claims

ABSTRACT OF THE DISCLOSURE

A method for recovering dust precipitated from a gas stream in an electrostatic precipitator where the dust is collected in a dissolving basin immediately below the precipitator, continuously injecting dissolving liquid into the basin to cause a swirling movement of the liquid solvent therein; and controlling the discharge from the basin to vary the liquid level in the basin periodically from a maximum level to a low or empty level whereby the swirling injected liquid flushes any undissolved dust which may have accumulated in the basin.

BACKGROUND OF THE INVENTION

The present invention relates to a method for recovering dust precipitated from a gas stream in an electrostatic precipitator and has particular application to the recovery of dust from soda recovery boilers.

In many cases there is a need to return dust precipitated in an electrostatic precipitator to a recovery plant such as a soda recovery boiler, in order to recover the valuable components in the dust, for example, black liquor.

Heretofore, dust precipitated in the electrostatic precipitator was removed by a screw or scraper conveyor, or was transported either in particulate form or dissolved in a liquid to the recovery plant. In the latter method, which is the most usual, it has proved difficult to dissolve the dust rapidly and without the formation of lumps which cause dust collections and similar disturbances in the dissolving basins and the transport pipes.

SUMMARY OF THE INVENTION

The present invention provides a liquid bath by continuously supplying liquid to a dissolving basin which constitutes the lower part of a precipitator. When the electrodes are cleaned, for example by rapping, dust falling from the electrodes is dissolved in the liquid bath and transported from the precipitator to a recovery plant. The volume of liquid maintained in the basin is varied periodically between a low and a high level by intermittently allowing the liquid to empty from the basin.

A principal object of the present invention is to provide a novel method of rapidly admixing dust without the formation of lumps and collection of dust in the dissolving basin and the transport pipes.

Other objects and a fuller understanding may be had by referring to the following description and claims taken in conjunction with the accompanying drawing.

BRIEF DESCRIPTION OF THE DRAWING

The figure is a fragmentary sectional view showing an electrostatic precipitator embodying the persent invention.

DESCRIPTION OF THE PREFERRED EMBODIMENT

Referring to the invention in more greater detail, an electrostatic precipitator 1 is shown for the cleaning of waste gases in connection with the combustion of black liquor in a soda recovery boiler (not shown). The precipitator comprises a number of emitting electrodes 2 and precipitating electrodes 3, arranged in a casing 4 provided with a gas inlet 5 and gas outlet 6 for clean gas. The lower part of the electrostatic precipitator is formed into a dissolving basin 7 and a dust-dissolving liquid is continuously supplied to the basin through a number of nozzles 8 positioned along the side surfaces of the basin 7 and on the same level.

In accordance with the invention, to insure an effective admixing of the dust in the basin 7, the nozzles are directed to continuously inject the liquid horizontally into the basin to cause a swirling movement of the liquid therein either in a clockwise or counterclockwise direction; and the liquid level in the basin is varied between a high or maximum level in the basin and a low or empty level whereby the continuously injected liquid from the nozzles 8 flushes any undissolved dust from the basin which may have accumulated.

In the embodiment shown, the liquid, in this case the black liquor, is supplied from a liquor tank 9 by a pump 10 via a pipeline 11 to the nozzles 8 to collect and dissolve the dust. An emptying valve 12 is provided at the bottom of the dissolving basin 7 to open and close at intervals to periodically vary the liquid level in the basin between the high and the low levels. The valve 12 preferably is closed during a first period corresponding to the time required to fill the basin 7 to the high level 13 immediately above the nozzles 8 and is opened during a second period corresponding to the time required to empty the basin 7 and flush out any undissolved dust, which may have accumulated on the bottom of the basin 7. During the emptying, when the valve 12 is open, the liquid is returned from the basin 7 through the line 14 to the tank 9 of black liquor and is recirculated again through the basin 7 to increase the concentration of dust dissolved therein.

What is claimed is:

1. A method for recovering dust suspended in a gas stream which comprises electrically precipitating said dust from the gas stream upon charged electrodes, causing said dust to fall by gravity from the electrodes, collecting said falling dust in a dissolving basin subjacent to and in communication with said electrodes, continuously injecting from at least one position adjacent the sides of the basin a liquid solvent horizontally and in a direction to cause a swirling movement of the solvent into said basin to maintain a sufficient volume of said solvent to collect and dissolve said falling dust, and intermittently emptying the solution from said basin to cause the level of said liquid solvent to continuously and periodically vary between a high and a low level.

2. A method for recovering dust suspended in a gas stream as defined in claim 1 including the step of controlling the intervals between said intermittent emptying to cause said high level of said liquid solvent to be located immediately above said position where said liquid solvent is injected, and said low level to be the substantially empty level.

3. A method for recovering dust suspended in a gas stream as defined in claim 1 including the step of recirculating the liquid solvent emptied from said basin back into said basin to obtain an increased concentration of said dust in said solvent.

References Cited

UNITED STATES PATENTS

| | | | |
|---|---|---|---|
| 827,549 | 7/1906 | Mauritzen | 137—397 |
| 884,483 | 4/1908 | Grantland | 137—397 X |
| 1,669,271 | 5/1928 | Webb | 137—397 X |
| 1,928,008 | 9/1933 | Courthope | 23—272 |
| 2,018,169 | 10/1935 | Williams et al. | 137—397 |
| 2,145,052 | 1/1939 | Lund | 137—397 |
| 2,614,651 | 10/1952 | Wintermute | 55—120 X |
| 2,614,652 | 10/1952 | Sultzer | 23—272 X |
| 2,672,946 | 3/1954 | Rabkin et al. | 55—120 |
| 2,689,019 | 9/1954 | Roberts et al. | 55—120 X |
| 2,841,238 | 7/1958 | Lenehan | 55—120 |
| 2,997,373 | 8/1961 | Stephens | 23—272.6 |
| 3,027,910 | 4/1962 | Oliver | 137—397 |
| 3,094,133 | 6/1963 | Treanor | 261—70 X |
| 3,109,630 | 11/1963 | Nichols | 55—101 X |

HARRY B. THORNTON, Primary Examiner

D. E. TALBERT, Jr., Assistant Examiner

U.S. Cl. X.R.

23—267; 55—112, 431; 137—397; 302—14